(12) United States Patent
Fan et al.

(10) Patent No.: US 10,862,532 B2
(45) Date of Patent: Dec. 8, 2020

(54) METHODS AND SYSTEM FOR HOPSET SELECTION

(71) Applicant: SZ DJI TECHNOLOGY CO., LTD., Shenzhen (CN)

(72) Inventors: Wei Fan, Shenzhen (CN); Naibo Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/671,878

(22) Filed: Nov. 1, 2019

(65) Prior Publication Data

US 2020/0067566 A1 Feb. 27, 2020

Related U.S. Application Data

(63) Continuation of application No. PCT/CN2017/083289, filed on May 5, 2017.

(51) Int. Cl.
| | |
|---|---|
| *H04B 1/02* | (2006.01) |
| *H04B 1/7143* | (2011.01) |
| *H04B 17/336* | (2015.01) |
| *B64C 39/02* | (2006.01) |
| *G05D 1/00* | (2006.01) |
| *H04B 1/715* | (2011.01) |
| *B64D 47/08* | (2006.01) |

(52) U.S. Cl.
CPC ......... *H04B 1/7143* (2013.01); *B64C 39/024* (2013.01); *G05D 1/0022* (2013.01); *H04B 1/715* (2013.01); *H04B 17/336* (2015.01); *B64C 2201/027* (2013.01); *B64C 2201/127* (2013.01); *B64C 2201/14* (2013.01); *B64D 47/08* (2013.01)

(58) Field of Classification Search
CPC .... H04B 1/7143; H04B 17/336; H04B 1/715; H04B 1/713; B64C 39/024; B64C 2201/027; B64C 2201/127; B64C 2201/14; G05D 1/0022; B64D 47/08; H04W 72/0453
USPC ................ 375/132, 133, 134, 135, 136, 137
See application file for complete search history.

(56) References Cited

U.S. PATENT DOCUMENTS

| | | | |
|---|---|---|---|
| 8,010,287 B1 * | 8/2011 | Frank ..................... | B64D 39/00 |
| | | | 701/470 |
| 2005/0003769 A1 | 1/2005 | Foerster et al. | |

(Continued)

FOREIGN PATENT DOCUMENTS

| | | |
|---|---|---|
| CN | 1440609 A | 9/2003 |
| CN | 1465142 A | 12/2003 |

(Continued)

OTHER PUBLICATIONS

The World Intellectual Property Organization (WIPO) International Search Report and Written Opinion for PCT/CN2017/083289 dated Jan. 29, 2018 6 pages.

*Primary Examiner* — Tesfaldet Bocure

(74) *Attorney, Agent, or Firm* — Anova Law Group, PLLC

(57) ABSTRACT

A computer-implemented method for communication includes obtaining power data associated with a plurality of channels of a frequency band, predicting an error rate for each of the plurality of channels based at least in part on the power data, and selecting a hopset of channels for frequency hopping from the plurality of channels based at least in part on the predicted error rates for the plurality of channels.

17 Claims, 13 Drawing Sheets

(56) References Cited

U.S. PATENT DOCUMENTS

| | | | |
|---|---|---|---|
| 2005/0286547 A1* | 12/2005 | Baum | H04L 5/023 370/437 |
| 2006/0013285 A1* | 1/2006 | Kobayashi | H04L 5/023 375/132 |
| 2006/0140251 A1* | 6/2006 | Brown | H04K 3/25 375/135 |
| 2006/0188004 A1* | 8/2006 | Kizu | H04B 1/713 375/132 |
| 2012/0300877 A1 | 11/2012 | Murakami et al. | |
| 2013/0308685 A1* | 11/2013 | Nagai | H04W 72/02 375/133 |
| 2018/0351690 A1* | 12/2018 | Kuhne | H04K 3/45 |
| 2019/0236962 A1* | 8/2019 | Tholen | H04N 7/1716 |
| 2020/0005656 A1* | 1/2020 | Saunamaeki | G05D 1/104 |

FOREIGN PATENT DOCUMENTS

| | | | | |
|---|---|---|---|---|
| CN | 1595826 A | | 3/2005 | |
| CN | 101304263 A | | 11/2008 | |
| CN | 102315860 A | | 1/2012 | |
| CN | 103385016 A | | 11/2013 | |
| WO | WO-2018201466 A1 | * | 11/2018 | H04B 1/7143 |

* cited by examiner

METHODS AND SYSTEM FOR HOPSET SELECTION

CROSS-REFERENCE TO RELATED APPLICATION

This application is a continuation of International Application No. PCT/CN2017/083289, filed May 5, 2017, the entire content of which is incorporated herein by reference.

BACKGROUND OF THE DISCLOSURE

Modern unmanned aerial vehicles (UAVs) are used to perform a variety of tasks such as navigation, surveillance and tracking, remote sensing, search and rescue, scientific research, and the like. However, providing interference-resistant communication for UAVs remains a challenge.

SUMMARY OF THE DISCLOSURE

According to embodiments, a computer-implemented method for communication is provided. The method comprises obtaining power data associated with a plurality of channels of a frequency band; predicting an error rate for each of the plurality of channels based at least in part on the power data; and selecting a hopset of channels for frequency hopping from the plurality of channels based at least in part on the predicted error rates for the plurality of channels.

According to embodiments, an unmanned aerial vehicle (UAV) is provided. The UAV comprises a memory that stores one or more computer-executable instructions; and one or more processors configured to access the memory and execute the computer-executable instructions to perform a method comprising: obtaining power data associated with a plurality of channels of a frequency band; predicting an error rate for each of the plurality of channels based at least in part on the power data; and selecting a hopset of channels for frequency hopping from the plurality of channels based at least in part on the predicted error rates for the plurality of channels.

According to embodiments, a communication system is provided. The communication system comprises a memory that stores one or more computer-executable instructions; and one or more processors configured to access the memory and execute the computer-executable instructions to perform a method comprising: obtaining power data associated with a plurality of channels of a frequency band; predicting an error rate for each of the plurality of channels based at least in part on the power data; and selecting a hopset of channels for frequency hopping from the plurality of channels based at least in part on the predicted error rates for the plurality of channels.

According to embodiments, one or more non-transitory computer-readable storage media is provided for storing computer executable instructions that, when executed by a computing system, configure the computing system to perform operations comprising: obtaining power data associated with a plurality of channels of a frequency band; predicting an error rate for each of the plurality of channels based at least in part on the power data; and selecting a hopset of channels for frequency hopping from the plurality of channels based at least in part on the predicted error rates for the plurality of channels.

In some embodiments, the power data associated with the plurality of channels comprises power spectral density (PSD) data. The PSD data associated with the plurality of channels may comprise noise power spectral density (NPSD) data and/or signal power spectral density (SPSD) data.

In some embodiments, obtaining the power data comprises selecting a set of one or more measurement channels from the plurality of channels, wherein channel bandwidths of the set of measurement channels collectively cover the frequency band, obtaining power data for each of the set of measurement channels; and obtaining power data for the plurality of channels using the power data for the set of measurement channels.

In some embodiments, the plurality of channels comprises a first channel and a second channel, wherein the first channel is in the set of measurement channels, and the second channel is not in the set of measurement channels.

In some embodiments, the first channel and the second channel overlap and power data for the second channel is obtained based on the power data for the first channel.

In some embodiments, predicting the error rate for each of the plurality of channels comprises calculating a set of signal-to-noise ratios (SNRs) for the channel based at least in part on the power data for the channel; determining a counter of the set of SNRs based on a SNR threshold; and predicting the error rate based at least in part on the counter.

In some embodiments, the counter indicates a number of the SNRs that exceed the SNR threshold.

In some embodiments, selecting the hopset of channels comprises selecting a predetermined number of channels from the plurality of channels by comparing the predicted error rates for the plurality of channels with one or more predetermined thresholds.

In some embodiments, the hopset of channels is used by a UAV to receive signals from a remote terminal via an uplink.

In some embodiments, the hopset is transmitted to the remote terminal via a downlink with the remote terminal.

In some embodiments, a channel is selected from the hopset for receiving signals from the remote terminal based on a function of the hopset and a timestamp.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

Figure 1:
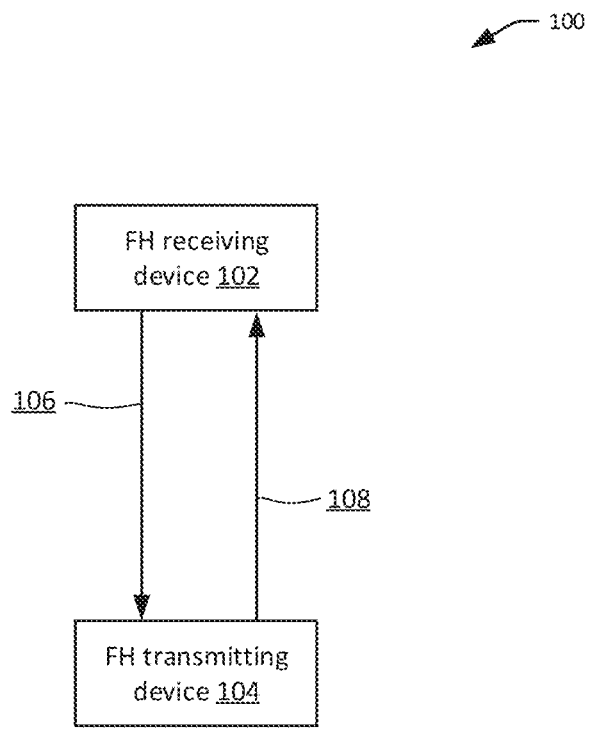
FIG. 1 illustrates an exemplary communication system for implementing hopset selection, in accordance with embodiments.

Frequency-hopping (FH) techniques have been used to resist interference and reduce noise in radio communication. Noise generally refers to unwanted influence on signals (e.g., white noise) such as caused by thermal noise, electronic noise from receiver input circuits, or interference from radiated electromagnetic noise picked up by the receiver's antenna. In a FH scheme, an available frequency band (e.g., the 2.4 GHz band) is divided into a plurality of communication channels. Each of the channels is associated with a given sub-frequency within the frequency band and a channel bandwidth. The carrier frequency used to transmit radio signals can be configured to rapidly change or "hop" among these sub-frequencies (or channels) in an order (e.g., predetermined or pseudorandom) known to both the transmitting device and the receiving device. Thus, interference at a particular frequency only affects the signal during the short interval during which that frequency is used to transmit the signal.

To improve performance, the set of channels or frequencies used for frequency hopping (hereinafter "hopset") may be configured to change adaptively according to the characteristics of the communication environment surrounding the communication devices. Such characteristics may include noise power, signal power, signal-to-noise ratio (SNR), and the like. For instance, channels with strong interference or low SNR may be removed from a hopset while channels with strong interference or high SNR may be added to the hopset. The changing hopset can be synchronized between transmitting and receiving devices.

According to embodiments, techniques are provided for improving communication using frequency hopping. Power data associated with a plurality of channels of a frequency band can be obtained over a period of time. Error rate for each of the plurality of channels can be predicted based at least in part on the power data. Subsequently, a hopset of channels for frequency hopping can be selected from the plurality of channels based at least in part on the predicted error rates for the channels.

According to embodiments, techniques are provided for efficiently obtaining power data of channels. Rather than measuring the power data for every available channel within the frequency band, only some of the channels are measured. In some embodiments, a set of one or more measurement channels is selected from the plurality of channels, such that the channel bandwidths of the measurement channels collectively and substantially cover the frequency band. Power data for each of the measurement channels is obtained and combined to generate the power data for the plurality of channels. Accordingly, the power data for the entire frequency band can be obtained in less time than when every channel within the frequency band is measured. Further, faster channel measurement means more reliable measurement results used for hopset selection, thereby improving the reliability of the frequency hopping scheme.

According to embodiments, techniques are provided for improving the accuracy and efficiency of hopset selection. In particular, the channels in the hopset are selected based on their respective, predicted error rates. In some embodiments, the error rates to be experienced by the channels can be predicted based on recent noise power data and/or average signal power. The channels with low predicted error rates can be selected in hopset for frequency hopping. The techniques described herein provide fast and relatively accurate estimation of the error rates to be experienced by the channels, thereby improving the performance of the frequency hopping scheme.

According to aspects of embodiments, techniques are provided for efficient synchronization of the hopset between transmitting and receiving devices. For example, the hopset can be transmitted between devices with an effective time. As another example, the hopset may be updated in response to a triggering event such as a change in the interference environment. As yet another example, a channel can be selected from the hopset use based on a function of the hopset and a timestamp.

FIG. 1 illustrates an exemplary communication system 100 for implementing hopset selection, in accordance with embodiments. The communication system 100 comprises a frequency hopping (FH) receiving device 102 and a frequency hopping (FH) transmitting device 104. The FH receiving device 102 can be configured to receive signals transmitted by the FH transmitting device 104 using a FH link 108. The FH transmitting device 104 can be configured to receive signals transmitted by the FH receiving device 102 using a reverse link 106. The FH link 108 and the reverse link 106 can be any wireless communication links such as radio links. The FH link 108 can utilize a frequency hopping scheme. The reverse link 106 may or may not use frequency hopping.

In some embodiments, the FH receiving device 102 and the FH transmitting device 104 may be configured to receive and transmit signals using a plurality of channels within a certain frequency band (e.g., the 2.4 GHz band). In some embodiments, the FH receiving device 102 can be configured to obtain (e.g., measure, estimate, and/or calculate) power data (e.g., noise power and/or signal power) of the channels within the frequency band and to generate or update a hopset of channels based on the power data. The hopset may be transmitted by the FH receiving device 102 to the FH transmitting device 104 via the reverse link 106. Subsequently, the FH receiving device 102 and the FH transmitting device 104 may be configured to communicate over the FH link 108 by hopping among the channels in the hopset.

In some embodiments, the FH receiving device 102 may be an uplink device. The FH transmitting device 104 may be a downlink device. The FH link 108 may be an uplink. The reverse link 106 may be a downlink. In other embodiments, the FH receiving device 102 may be a downlink device. The FH transmitting device 104 may be an uplink device. The FH link 108 may be a downlink. The reverse link 106 may be an uplink.

In some embodiments, the FH receiving device 102 can include or be included by an unmanned aerial vehicle (UAV) or any other movable object described herein. The FH transmitting device 104 can include or be included by a remote terminal such as a ground station, a remote controller, a mobile device, and the like. In some other embodiments, the FH receiving device 102 can include or be included by a remote terminal such as a ground station, a remote controller, a mobile device, and the like. The FH transmitting device 104 can include or be included by an unmanned aerial vehicle (UAV) or any other movable object described herein.

Figure 2:
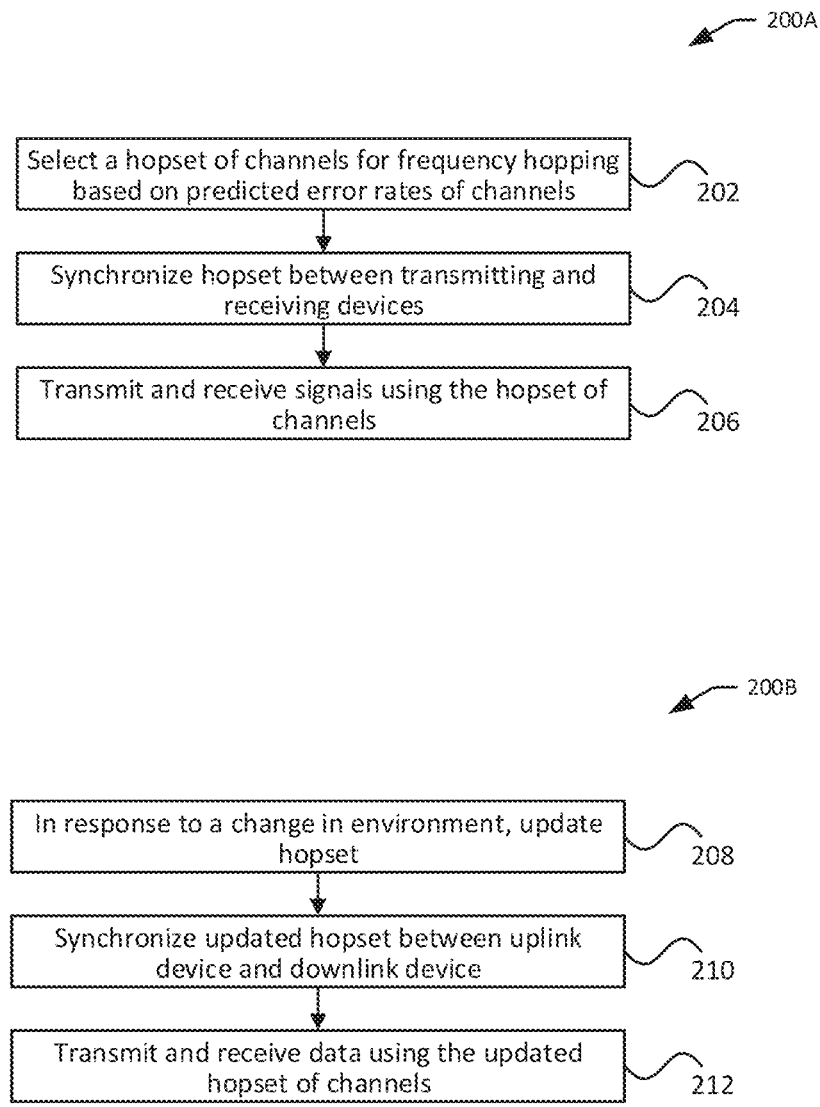
FIG. 2 illustrates exemplary processes for implementing frequency hopping, in accordance with embodiments.

FIG. 2 illustrates exemplary processes 200A and 200B for implementing frequency hopping, in accordance with embodiments. Some or all aspects of the process 200 (or any other processes described herein, or variations and/or combinations thereof) may be performed by one or more processors associated with the FH receiving device 102 and/or the FH transmitting device 104. Some or all aspects of the process 200 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. The order in which the operations are described is not intended to be construed as a limitation, and any number of the described operations may be combined in any order and/or in parallel to implement the processes.

Turning first to process 200A of FIG. 1. At block 202, a hopset of channels for frequency hopping is selected based on predicted error rates of the channels. For examples, channels with lower predicted error rates may be selected into the hopset, while channels with higher predicted error rates may be excluded from the hopset. In some embodiments, the selection of the hopset may be implemented by an FH receiving device 102 shown in FIG. 1. In other embodiments, the selection of the hopset may be implemented by other devices. More detailed discussion of hopset selection is provide elsewhere herein, e.g., in connection with FIGS. 4-9.

At block 204, the selected hopset is synchronized between transmitting and receiving devices, such that both devices have the same hopset for use with frequency hopping. For instance, the hopset can be transmitted by the FH receiving device 102 to the FH transmitting device 104 shown in FIG. 1. More detailed discussion related to hopset synchronization is provide elsewhere herein.

At block 206, the hopset is used for transmitting and/or receiving signals using frequency hopping techniques. For example, the FH transmitting device 104 and the FH receiving device 102 may be configured to "hop" among the channels in the hopset for signal transmission and reception, respectively. The frequency hopping between the transmitting and the receiving devices need to be synchronized, such that signals transmitted using a given channel is also received at that channel. More detailed discussion related to channel synchronization is provided elsewhere herein.

Turning to process 200B of FIG. 1. At block 208, a hopset is updated in response to a change in the environment, such as an increase/decrease in interference or signal-to-noise ratio (SNR). For example, the hopset may be updated when the SNR reaches a predetermined threshold value. In some embodiments, the hopset may be updated based on predicted error rates of the channels as describe in further detail elsewhere herein. For instance, one or more channels may be removed from the hopset due to their increased error rates for the channels. Conversely, one or more channels may be added to the hopset due to their lowered error rates.

At block 210, the updated hopset is synchronized between transmitting and receiving devices, such that both devices have the same hopset for use with frequency hopping. The block 210 may be implemented in a similar manner as for block 204 of process 200A. At block 212, the hopset is used for transmitting and/or receiving signals using frequency hopping techniques.

The block 210 may be implemented in a similar manner as for block 206 of process 200A.

Figure 3:
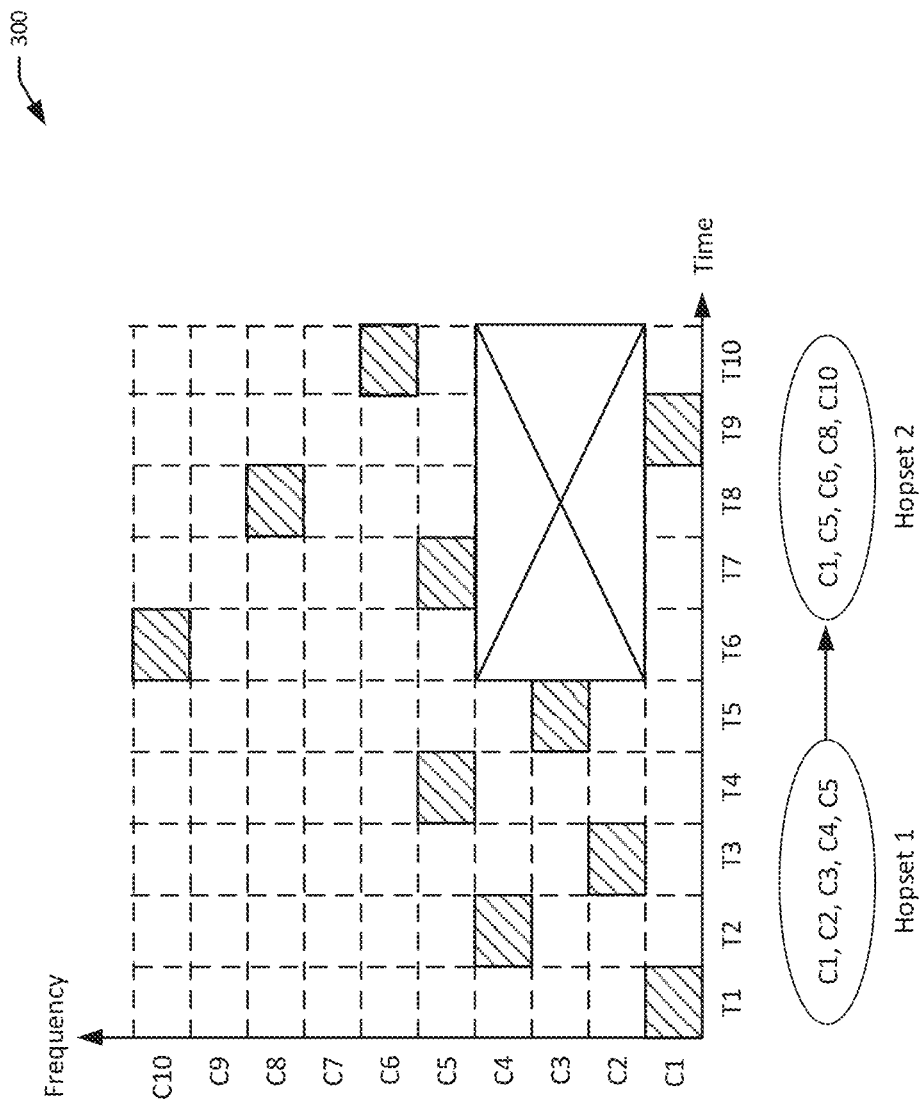
FIG. 3 illustrates an exemplary process for selecting a hopset, in accordance with embodiments.

FIG. 3 illustrates an exemplary process 300 for selecting a hopset, in accordance with embodiments. The horizontal axis shows time of signal transmission starting from T1 and the vertical axis shows the frequencies or channels in a frequency band or spectrum, starting from C1. The shaded areas illustrate the frequencies or channels used to transmit signals at given time slots. For example, at T1, the channel C1 is used to transmit signals. A first hopset (hopset 1) comprising channels C1, C2, C3, C4, and C5 is used to transmit signals starting at T1. The order in which the channels within the hopset are selected may be predetermined or pseudorandom. The exemplary order shown in FIG. 3 is C1, C4, C2, C5, and C3 at T1, T2, T3, T4, and T5, respectively. However, due to changes in the characteristics of the communication environment, channels/frequencies from the first hopset may be added and/or removed. For instance, the power data at some or available channels may be obtained and the channels with the low predicted error rate may be selected. The newly selected channels may form an updated hopset 2. Compared with hopset 1, hopset 2 can include addition channels determined to have relatively low error rates, noise or interference (e.g., C6, C8, and C10), while excluding channels determined to have relatively high error rates, noise or interference (e.g., C2 and C3). By adaptively changing the hopset according to the characteristics of the communication environment, the overall performance of the frequency hopping scheme can be improved.

Figure 4:
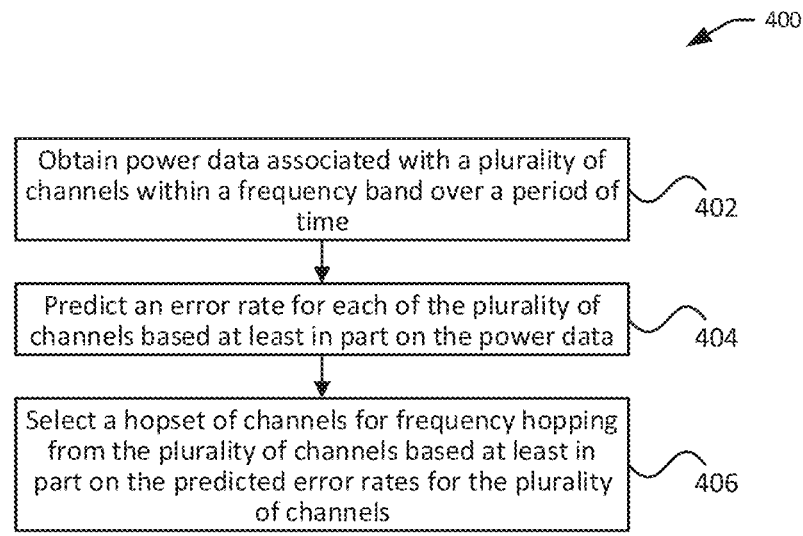
FIG. 4 illustrates an exemplary process for selecting a hopset, in accordance with embodiments.

FIG. 4 illustrates an exemplary process 400 for selecting a hopset, in accordance with embodiments. Aspects of the process 400 may be performed by one or more processors associated with the FH receiving device 102, the FH transmitting device 104, or both.

Figure 7:
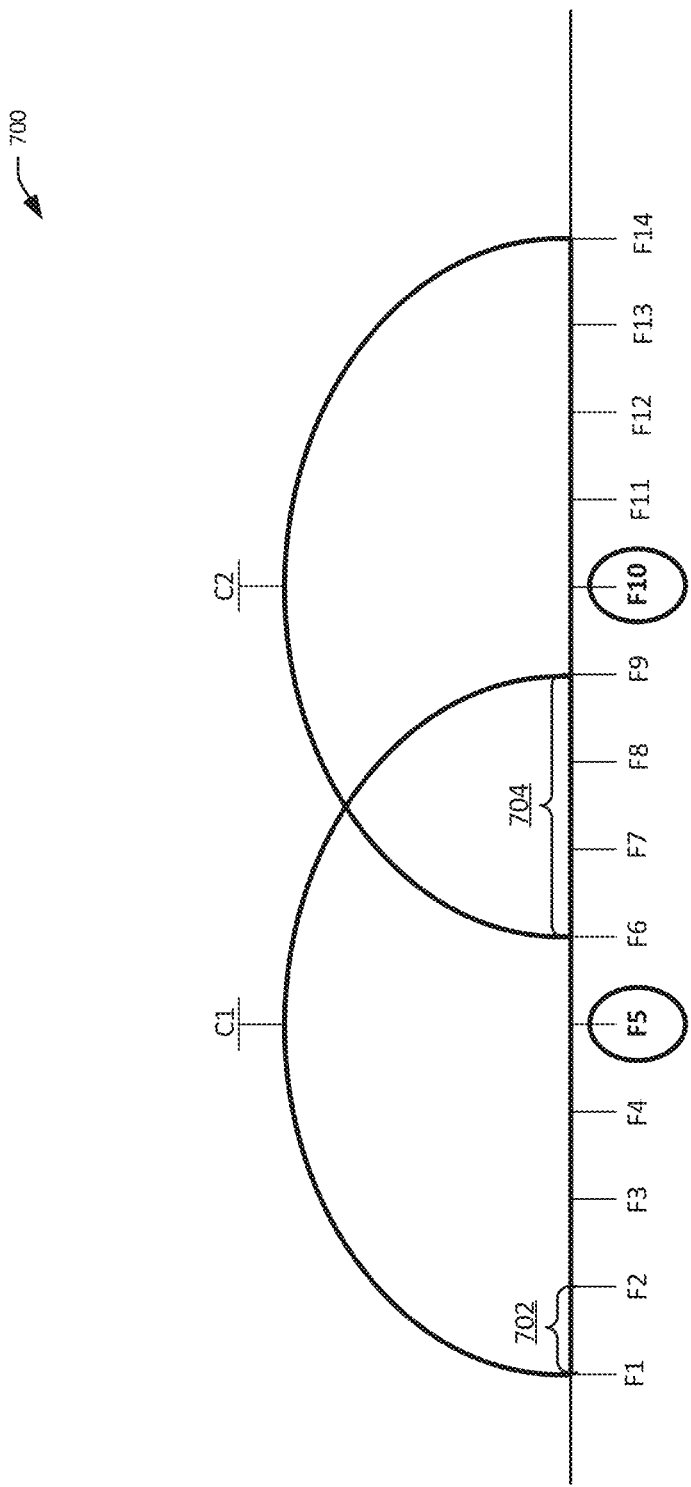
FIG. 7 illustrates obtaining power data for exemplary overlapping channels, in accordance with embodiments.
Figure 8:
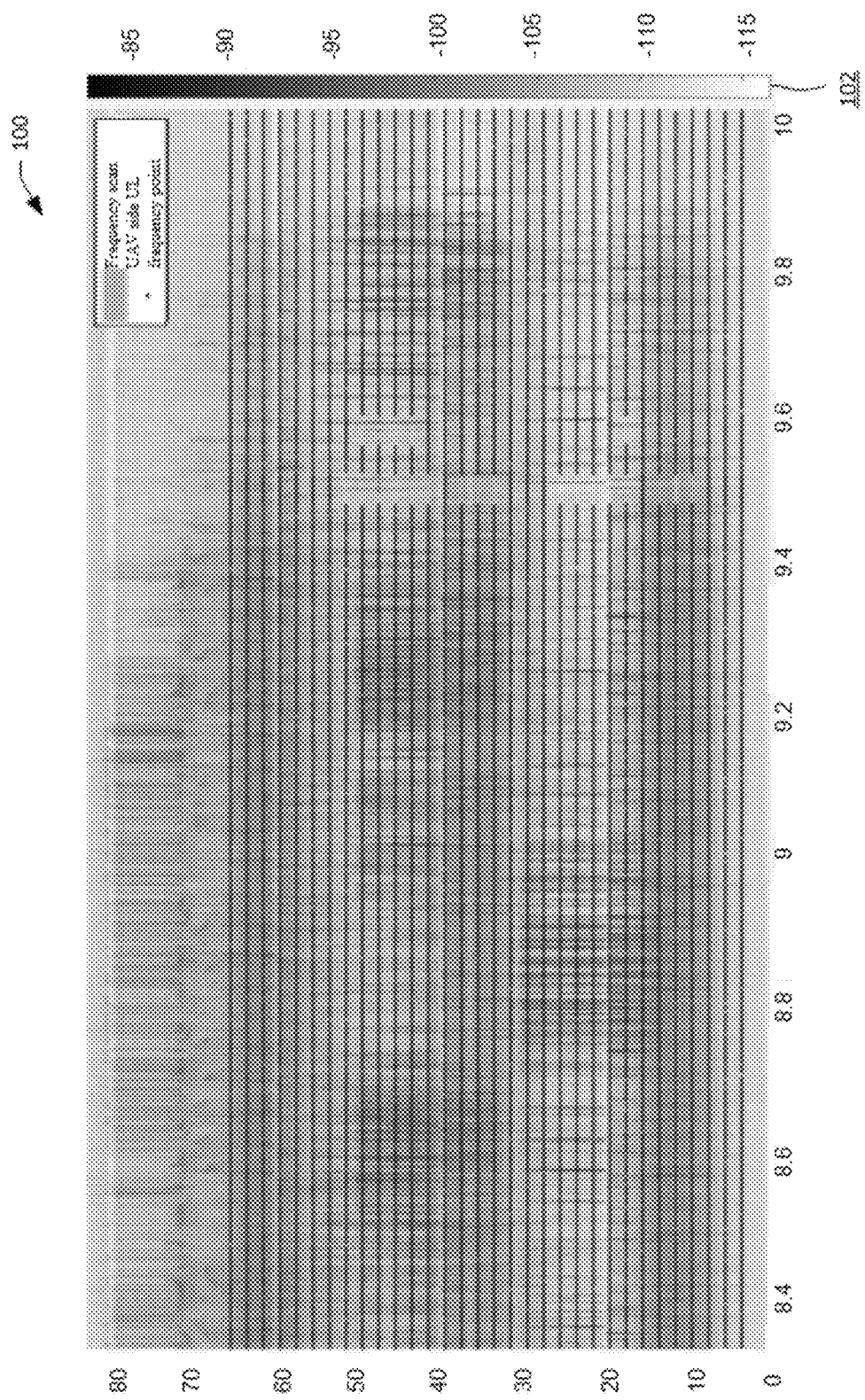
FIG. 8 illustrates an exemplary spectrogram showing power data over time, in accordance with embodiments.

At block 402, power data associated with a plurality of channels (frequencies) within a frequency band is obtained over a period of time. In some embodiments, the power data may be obtained according to the process 500 of FIG. 5. FIGS. 7-8 illustrate exemplary obtained power data.

At block 404, an error rate is predicted for each of the plurality of channels based at least in part on the power data obtained above. In some embodiments, the error rates may be predicted according to the process 900 of FIG. 9.

The error rates may be predicted using alternative methods. In an embodiment, the error rate is predicted based on a number of times or percentage of measurement results where the noise or interference power (e.g., NPSD) exceeds a predetermined threshold. In another embodiment, for channels/frequencies that are or were in a hopset, the predicted error rate can be based on the statistical analysis of the error rates in data transmission (e.g., block error rate (BLER)).

At block 406, a hopset of channels is selected from the plurality of channels based at least in part on the predicted error rates of the channels. In some embodiments, the hopset may be selected according to the process 1000 of FIG. 10.

The hopset may be selected using alternative methods. For example, the hopset can be selected based at least in part on a geographic location of the communication environment (e.g., a geographic location of the FH receiving device such as a UAV). For example, certain channels may have strong interference at certain geographic locations, and hence should not be selected in the hopset. Conversely, certain channels may have little interference at certain geographic locations, and hence should be included. The rules governing the inclusion or exclusion of the channels based on geographic locations nay be stored locally (e.g., in a memory associated with a FH receiving device such as a UAV), or in a network device (e.g., a cloud-based storage device). As another example, a given geographic location may be associated with a given hopset. The association between geographic locations and the hopsets may be stored locally (e.g., in a memory associated with a FH receiving device such as a UAV), or in a network device (e.g., a cloud-based storage device).

In some embodiments, the power data for the channels is measured and calculated on a continuous or periodic basis. Therefore, when the communication environment changes, such change can be quickly detected based on the power data and the hopset can be timely updated, where necessary. Subsequently, the updated to the hopset may be synchronized across devices to enable frequency hopping based on the updated hopset.

Figure 5:
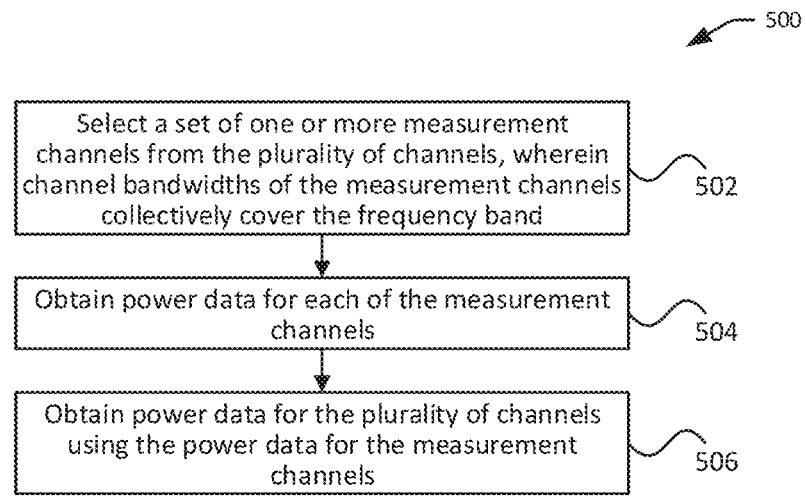
FIG. 5 illustrates an exemplary process for obtaining power data associated with a plurality of channels, in accordance with embodiments.

FIG. 5 illustrates an exemplary process 500 for obtaining power data associated with a plurality of channels, in accordance with embodiments. Aspects of the process 500 may be performed by one or more processors associated with the FH receiving device 102, the FH transmitting device 104, or both.

At block 502, a set of one or more measurement channels are selected from a plurality of channels within a given frequency band, such that the channel bandwidths of the measurement channels collectively cover the frequency band. In this disclosure, the set of one or more measurement channels is also referred to as a "measurement set." The channel bandwidth(s) of the one or more measurement channels in the measurement set collectively form a collective set bandwidth.

Figure 6:
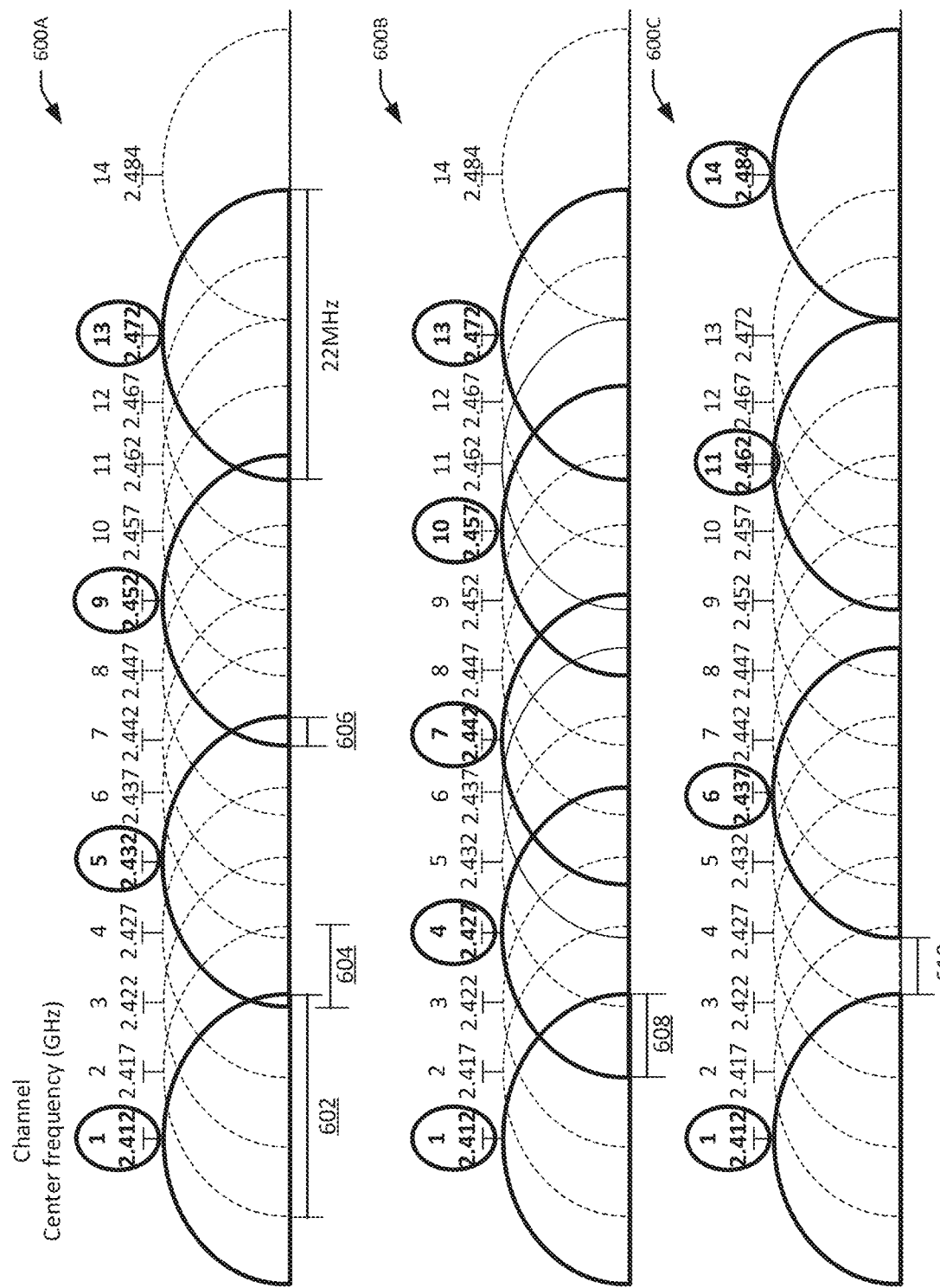
FIG. 6 illustrates an exemplary frequency band with a plurality of channels, in accordance with embodiments.

Turning now to FIG. 6, which illustrates an exemplary frequency band with a plurality of channels. As illustrated, the 2.4 GHz frequency band (from 2.4 GHz to 2.4835 GHz) is divided into 14 channels with respective center frequencies ranging from 2.412 GHz to 2.484 GHz. For each measurement channel, the bandwidth of the receiving signals (channel bandwidth) is about 22 MHz. While the channels shown in FIG. 6 have identical channel bandwidth, it is understood that in other embodiments, the channels may have different channel bandwidths. For instance, channel 1 is centered at frequency 2.412, channel 2 is centered at frequency 2.417, and so on. Thus, the channel bandwidths of some of the channels overlap. Instead of measuring channel conditions (e.g., power data) for all channels, only a subset of the channels can be measured to derive the condition for the whole frequency band. The collective bandwidths of the selected measurement channels substantially cover the frequency band. Substantially covering the frequency band may include covering 100% of the frequency band, or covering up to or more than 50%, 60%, 70%, 80%, 90%, or 95% of the frequency band.

For example, in the embodiment 600A, channels 1, 5, 9, and 13 are selected for measurement. These channels substantially cover the 2.4 GHz frequency band. A non-selected channel may overlap with at least one selected channel. Therefore, the power data for the non-selected channels (e.g., channels 2, 3, 4, 6, 7, 8, 10, 11, 12) may be estimated using the power data for the selected channels. For example, the non-selected channel 2 overlaps with the selected channel 1 at spectrum 602. Thus, the power data for channel 1 at spectrum 602 can be used for the power data for channel 2 at spectrum 602. Similarly, channel 2 overlaps with the selected channel 5 at spectrum 604. Thus, the power data for channel 5 at spectrum 604 can be used for the power data for channel 2 at spectrum 604. Thus, the power data for the entire channel bandwidth of channel 2 can be obtained by combining the power data for the channel 1 and the power data for channel 5.

In some embodiments, at least two adjacent measurement channels may overlap so as to enable more reliable coverage for the frequency band. The power data for an overlap portion between a first channel and a second channel can be based on the power data of the first channel, the power data of the second channel, or both. For example, adjacent measurement channels 5 and 9 overlap at portion 606. The power data for the portion 606 can be the power data of channel 5 that corresponds to the option 606, the power data of channel 9 that corresponds to the option 606, or a combination (e.g., a linear combination such as an average) of both.

In some embodiments, increasing the number of measurement channels can increase the reliability of measurement data. For example, in the embodiment 600B, channels 1, 4, 7, 10, and 13 are selected for measurement. These channels substantially cover the 2.4 GHz frequency band and provide wider overlap between selected channels than shown in the embodiment 600A. For example, the overlap portion 608 in embodiment 600B is wider than the overlap portion 606 in embodiment 600A. A wider overlap means multiple measurement results are available for a larger portion of the spectrum, enabling a more accurate and reliable estimation for the overlap portion.

In some embodiments, such as 600C, at least two adjacent measurement channels do not overlap. As illustrated, channels 1, 6, 11, and 14 may be selected for measurement. The selection of channel 14 may be optional. Adjacent channels 1 and 6 do not overlap. Similarly channels 6 and 11 do not overlap. In such embodiments, power data for a portion that does not have direct measurement data may be obtained based on measurement data from neighboring regions. For example, the power data for the gap 610 between channel 1 and channel 6 can be estimated using the power data for channel 1, the power data for channel 6, or both. For example, the power data for the gap 610 may be calculated as an average of the power data of the channel 1 and the power data of the channel 6.

As discussed herein, the selective measuring of some, but not all, of the channels within a frequency band can shorten the amount of time, as well as the amount of processing, required to estimate power data for an entire frequency band. In some examples, the reduction in processing time or workload can be around 5%, 10%, 20%, 30%, 40%, 50°, 60%, 70%, 80%, or 90% compared with full measurement or scan of all the channels. Additionally, the reduced processing time means that the processing results are more likely to be up-to-date, reflecting the actual environment (which may change over time). Thus, the results are likely more reliable than those obtained using the full scan.

Referring back to FIG. 5, at block 504, power data for each measurement channel is obtained. The power data may be estimated at a predetermined resolution such as 1 MHz. That is, the power data is estimated for every 1 MHz within the channel bandwidth. The measurement resolution may be configurable (e.g., by a user). Measurement at a higher resolution yields more reliable results but takes longer time, while measurement at a lower resolution yields less reliable results but takes shorter time.

In some embodiments, power data may include power spectral density (PSD) data, which describes the distribution of power into frequency components of the signals. The power data can include power data for the intended signals, such as signal power spectral data (SPSD). Alternatively or additionally, the power data can include power data for noise such as noise power spectral data (NPSD).

Obtaining power data may include measuring, transforming, estimating, or otherwise processing data related to power. For example, any suitable spectral density estimation (SDE) techniques can be used to estimate the spectral density of a signal from a sequence of time samples of the signal. Such techniques can include non-parametric and parametric SDE techniques. Non-parametric SDEs can include periodogram, Bartlett's method. Welch's method, multitaper, lease-squares spectral analysis, non-uniform discrete Fourier transform, singular spectrum analysis, short-time Fourier transform, and the like. Parametric SDEs can include autoregressive model (AR) estimation, moving-average (MA) model, autoregressive moving average (ARMA) estimation, maximum entropy spectral estimation, and the like.

At block 506, power data for the plurality of channels is obtained using the power data for the measurement set of channels. As discussed earlier, once the power data for the selected measurement channels is obtained, the power data for the non-selected channels may be obtained based on the power data for the selected channels. For example, if a non-select channel overlaps with a selected channel, the power data for the selected channel over the overlap portion can be used as the power data for the non-select channel for the overlap portion. If a non-select channel does not overlap with a selected channel, the power data for the closest selected channel(s) can be used to estimate the power data for the non-select channel (e.g., by taking an average). Power data for two overlapping portions, a first portion and a second portion, can be calculated based on the power data for the first portion, the power data for the second portion, or both.

FIG. 7 illustrates obtaining power data for exemplary overlapping channels C1 and C2, in accordance with embodiments. The Channels C1 and C2 overlaps at 704. Channel C1 is selected for measurement at a resolution 702. F5 is the center frequency for channel C1. For example, assuming the channel bandwidth of C1 is 8 MHz, and the resolution 702 is 1 MHz, then the power data is measured at frequencies F1 to F9 which are 1 MHz apart. As illustrated, when F5 is selected for measurement, the non-selected frequencies, F1-F4 and F6-F9 are also measured.

Assuming C2 (with center frequency F10) has the same channel bandwidth and measurement resolution as C1, then C2 is measured at frequencies F6 to F14, also 1 MHz apart. Thus, when F10 is selected for measurement, the non-selected frequencies, F6-F9 and F11-F14 are also measured.

The frequencies falling within the overlapping portion 704 between C1 and C2, F6-F9 are measured twice, once when C1 is measured and again for C2 is measured. The power data at a frequency in the overlapping portion 704 (e.g., F6, F7, F8, or F9) can be obtained based on the power data of C1 at that frequency, the power data of C2 at that frequency, or both (e.g., an average). Thus, the reliability measurement for the overlapping portion is higher than the non-overlapping portions. While C1 and C2 are shown in FIG. 7 to have the same channel bandwidth and measurement resolution, it is understood that the selective measurement techniques described herein apply to other embodiments where measurement channels have different channel bandwidth and/or measurement resolutions.

In some embodiments, the power data obtained herein can be used to generate a spectrogram, which may then be used to determine the hopset. FIG. 8 illustrates an exemplary spectrogram 800 showing power spectral density (PSD) data with respect to time, in accordance with embodiments. The x-axis denotes time (e.g., in milliseconds) and the y-axis denotes frequency (e.g., in MHz). For each (time, frequency) point in the spectrogram, a grayscale value indicates the corresponding PSD value in dBM/MHz according to the grayscale 802, where higher PSD values correspond to higher grayscale values (darker), and lower PSD values correspond to lower grayscale values (lighter). At any given point in time, the frequencies selected to be in a hopset is denoted in bold.

Figure 9:
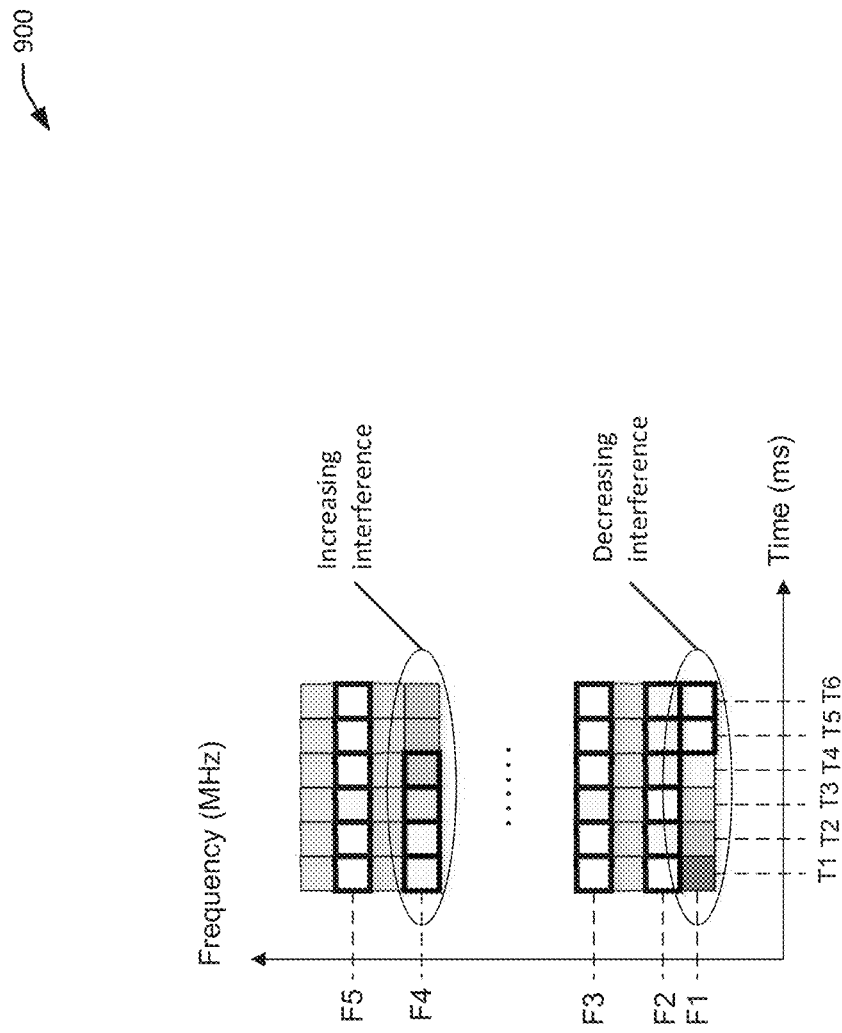
FIG. 9 illustrates portions of an exemplary spectrogram in detail.

FIG. 9 illustrates portions of the exemplary spectrogram 800 in detail. The power density information associated with each (time, frequency) unit is represented by the corresponding grayscale value. The bolded box around a (time, frequency) unit indicates that the frequency is selected in the hopset for use by frequency hopping. For example, at time T1, T2, T3 and T4, the hopset includes F2, F3, F4 and F5. At T5 and T6, the hopset is updated to includes F1, F2, F3, and F5. As illustrated, the PSD for F1 decreases over time, indicating decreasing interference at F1, until the interference is low enough for F1 to be added to the hopset at T5. On the other hand, the PSD for F4 increases over time, indicating increasing interference at F5, until the interference is high enough for F4 to be removed from the hopset at T5. In some embodiments, the spectrogram may be generated based on measurement results and used to predict error rates and to select a hopset as described in FIGS. 10-11.

According to embodiments, the channels in a hopset can be selected according to predicted error rates. The error rates can be predicted based on power data indicating interference and/or power data indicating signal strength. In particular, the prediction of error rates leverages a series of measurement results from recent measurements, thereby improving accuracy and reliability of the prediction.

Figure 10:
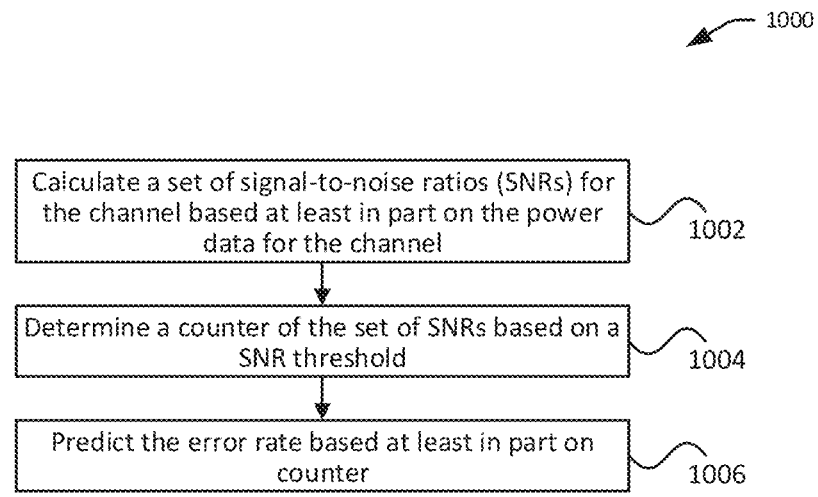
FIG. 10 illustrates an exemplary process for predicting error rate of a channel, in accordance with embodiments.

FIG. 10 illustrates an exemplary process 1000 for predicting error rate of a channel, in accordance with embodiments. Aspects of the process 1000 may be performed by one or more processors associated with the FH receiving device 102, the FH transmitting device 104, or both.

At block 1002, a set of signal-to-noise ratios (SNRs) are calculated for each of the plurality of channels based at least in part on the power data for that channel. The power data may be obtained using methods described in FIGS. 5-9.

For example, for a given channel c, at a given time t, the interference power measured at the most recent M measurements is $P_I(m)$; $m=1, 2, \ldots, M$, where M is an integer greater than or equal to 1. Let average $\overline{P}_s$ denotes the average signal power at time t, then $SNR(m)=10*\log_{10}(\overline{P}_s/P_I(m))$; $m=1, 2, \ldots, M$. In some embodiments, the interference power and/or the average signal power can be obtained using the selective measurement techniques as described herein (e.g., in FIGS. 5-8).

At block 1004, a counter of the set of the SNRs is determined based on an SNR threshold. For example, the counter M' can denote the number of times when SNR(m) <T, where T is an SNR threshold. The threshold T can be determined based on experiments or simulation. In an example, the value T can be the value of SNR when the error rate around 500/% in a channel under an additive white Gaussian noise (AWGN) model. That is, when SNR<T, the block error rate (BLER) is greater than 50%. Because BLER decreases sharply from 100% to 50%, it can be assumed approximately that error has occurred when SNR<T. Conversely, when SNR>T, BLER<50%. Because BLER decreases sharply from 50% to 0%, it can be assumed approximately that error has not occurred when SNR>T.

In some embodiments, the SNR threshold T can be adjusted based on real scenarios. For example, the SNR threshold T may be adjusted (e.g., increased) based on practical considerations such as consideration of multipath channels, and the like. The adjustment amount can be determined based on field measurement.

At block 1006, an error rate to be experienced by the given channel can be predicted based at least in part on the counter determined above. For example, the predicted error rate for the given channel can be M'/M.

In some embodiments, a predetermined number of channels can be selected from the plurality of channels by comparing the predicted error rates for the plurality of channels with one or more predetermined thresholds. The predetermined number can be a minimum number of channels in a hopset such as 15.

Figure 11:
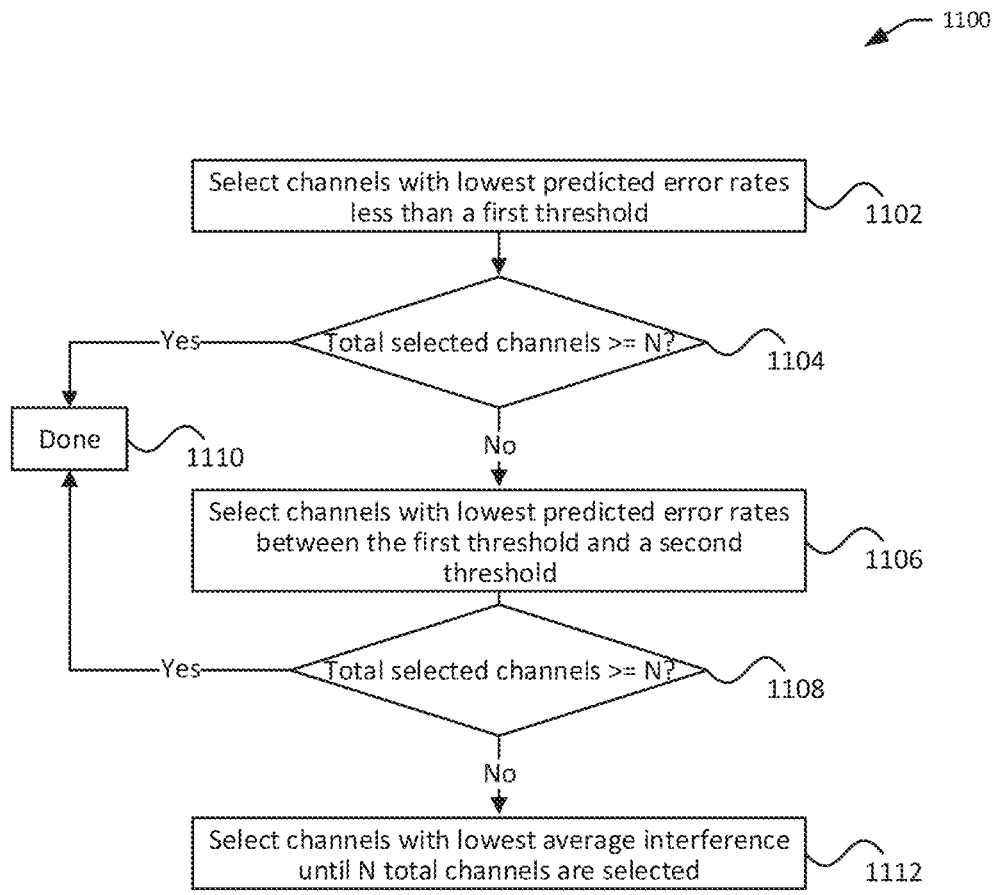
FIG. 11 illustrates an exemplary process for selecting a hopset of channels, in accordance with embodiments.

FIG. 11 illustrates an exemplary process 1100 for selecting a hopset of channels, in accordance with embodiments. Aspects of the process 1100 may be performed by one or more processors associated with the FH receiving device 102, the FH transmitting device 104, or both.

At block 1102, channels with the lowest predicted error rates that is less than a predetermined first threshold. The channels may all available channels within a frequency band and the predicted error rates can be determined based on power data obtained using techniques described herein. The channels may be ranked or sorted according to their respective predicted error rates, for example, from the lowest to highest error rates. The N channels with the lowest error rates may be selected for the hopset, where N is the minimum number of hopset (e.g., 15). The N may be any suitable positive integer. In some examples, N may be predetermined for a certain frequency band in compliance with relevant regulations. In some embodiments, the first threshold may be a low threshold for block error rate (BLER).

At block 1104, it is determined whether the number of total selected channels from block 1102 is equal to or greater than N. If yes, then the hopset selection process ends at block 1110. Otherwise, at block 1106, channels with the lowest predicted error rates that are between the first threshold and a second threshold are selected. The second threshold may be higher than the first threshold. In some embodiments, the second threshold may be a high threshold for BLER.

At block 1108, it is determined whether the number of total selected channels so far is equal to or greater than N. If yes, then the hopset selection process ends at block 1110. Otherwise, at block 1112, channels with the lowest average interference power are selected until N total channels have been selected. In some embodiments, the remaining channels are ranked or sorted according to their respective average interference power (which may be obtained as part of the power data) and the top channels are selected until N total channels are selected.

In some embodiments, a FH link (e.g., the FH link 108 of FIG. 1) is configured to support transmissions across multiple frequency bands. In such embodiments, the hopset selection techniques described herein can be extended to select a hopset of channels from different frequency bands. The power data for each of the frequency bands can be obtained using the selective measurement techniques described herein. Besides power data, other factors may be considered in hopset selection, such as different characteristics between different frequency bands including transmission power, antenna gain, propagation loss, and the like.

According to various embodiments, techniques are provided for synchronizing FH channels between two communication devices. The synchronization of FH channels can include the synchronization of hopset between devices and the synchronization of the selection of a particular channel from the hopset.

When a hopset is generated or updated (e.g., by the FH receiving device 102), control data including the updated hopset may be transmitted to the FH transmitting device (e.g., via the reverse link 106). However, due to interference, fading, and other factors, the FH transmitting device may fail to receive such control data, leading to different hopsets being used by the FH transmitting and FH receiving devices. The techniques described in the following examples may be used, alone or in combination, to reduce occurrence of such discrepancy. In the following discussion, the transmission of a hopset can include transmission of the channels within the hopset or transmission of a difference (delta) between an updated hopset and an older hopset, such as the added or removed channels.

In an example, the FH receiving device repeatedly transmits the hopset to FH transmitting device (e.g., via the reverse link 106). Failure to receive the hopset by the FH transmitting device at one time does not necessarily prevents the FH transmitting device from eventually receiving the correct hopset, e.g., after the FH transmitting device resumes normal operation or when the communication environment improves.

In another example, an effective time indicating when a hopset becomes effective can be transmitted besides the hopset. The effective time can be set to allow some time for the FH transmitting device to obtain the updated hopset before the hopset becomes effective. In some embodiments, other timing information such as an expiration time or validity duration associated with the hopset may be transmitted instead of or in addition to the effective time.

In another example, the hopset can be configured to change at a reduced frequency. For example, the hopset may be configured to change only in response to significant changes in interference. As another example, a predetermined time period must lapse between consecutive hopset changes.

In some embodiments, the synchronization of the selection of channels within a hopset may be achieved using timestamps. In an embodiment, the transmitting device and the receiving device can each maintain a timestamp. The timestamps of the devices can be synchronized via communication between the devices. At any given transmission time, the channel that is selected from the hopset for transmission can be a function of both the hopset and the timestamp of the respective device. Thus, as long as the hopsets used by the devices are the same, the channels selected for the transmission and reception of the signals at any given time are also the same.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$3, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

The UAV can include a propulsion system having four rotors. Any number of rotors may be provided (e.g., one, two, three, four, five, six, or more). The rotors, rotor assemblies, or other propulsion systems of the unmanned aerial vehicle may enable the unmanned aerial vehicle to hover/ maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
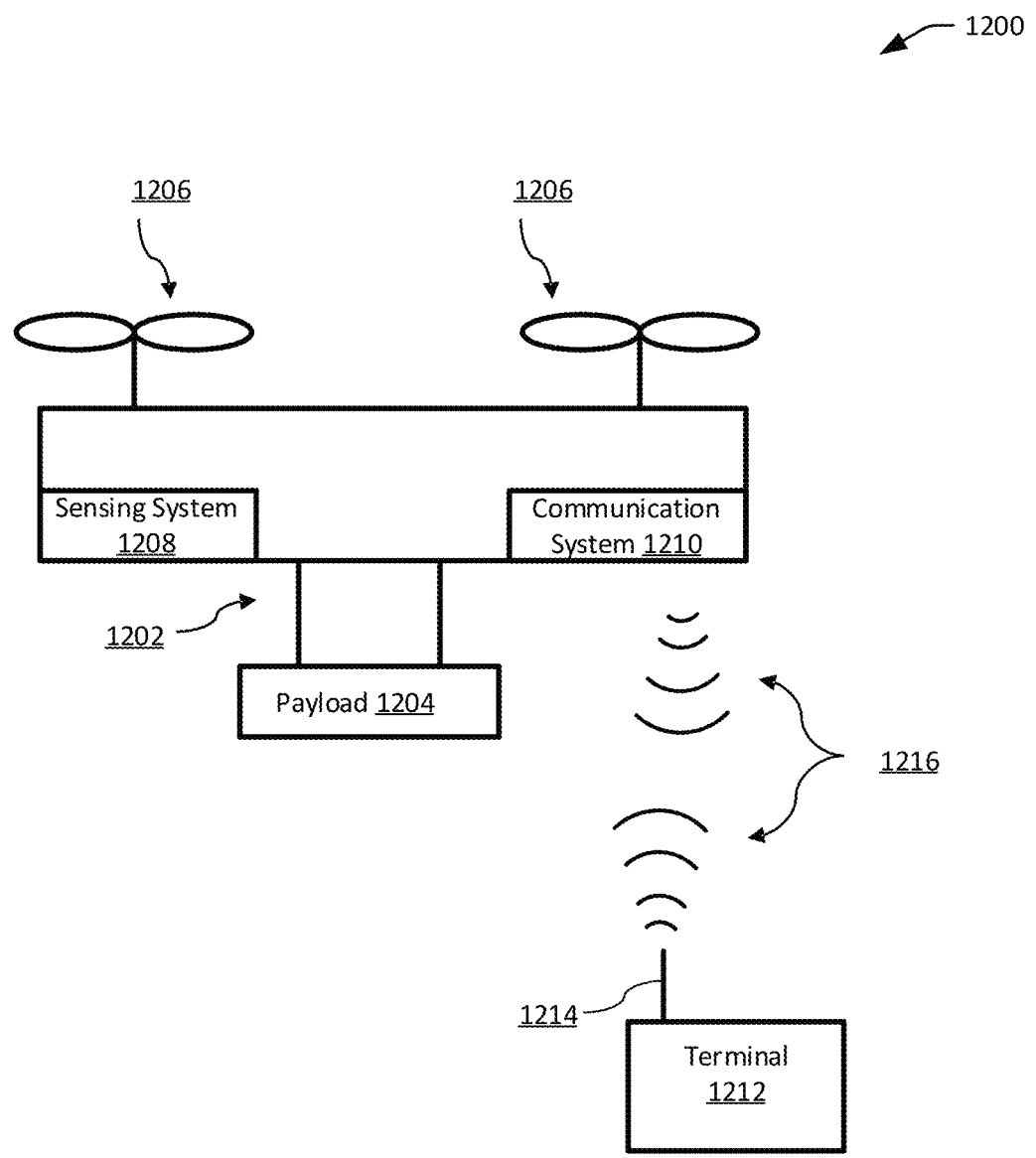
FIG. 12 illustrates a movable object including a carrier and a payload, in accordance with embodiments.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanisms 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication; such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
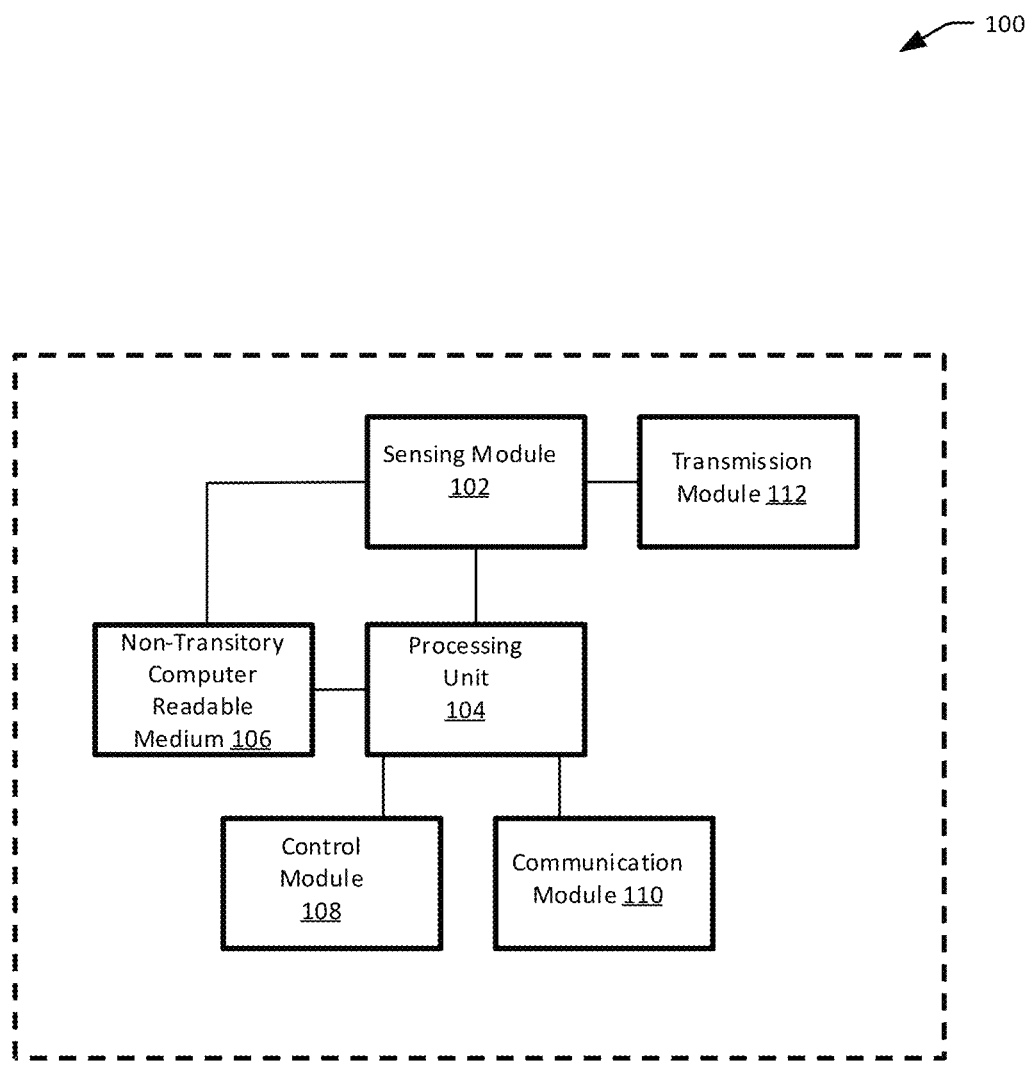
FIG. 13 is a schematic illustration by way of block diagram of a system for controlling a movable object, in accordance with embodiments.

FIG. 13 is a schematic illustration by way of block diagram of a system 1300 for controlling a movable object, in accordance with embodiments. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable or non-programmable processor (e.g., a central processing unit (CPU), a microprocessor, an FPGA, an application-specific integrated circuit (ASIC)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A computer-implemented method for communication, comprising:
   obtaining power data associated with a plurality of channels of a frequency band, comprising:
   selecting a measurement set including one or more measurement channels from the plurality of channels, a collective set bandwidth of the measurement set covering the frequency band;
   obtaining power data for the measurement set by obtaining power data for each of the one or more measurement channels in the measurement set; and
   obtaining the power data for the plurality of channels using the power data for the measurement set;
   predicting an error rate for each of the plurality of channels based at least in part on the power data for the plurality of channels; and
   selecting a hopset of channels for frequency hopping from the plurality of channels based at least in part on the predicted error rates for the plurality of channels.

2. The method of claim 1, wherein the power data associated with the plurality of channels comprises power spectral density (PSD) data.

3. The method of claim 2, wherein the PSD data associated with the plurality of channels comprises at least one of noise power spectral density (NPSD) data or signal power spectral density (SPSD) data.

4. The method of claim 1, wherein the plurality of channels comprise a first channel and a second channel that overlaps with the first channel, wherein the first channel is in the measurement set and the second channel is not in the measurement set, and wherein power data for the second channel is obtained based on the power data for the first channel.

5. The method of claim 1, wherein predicting the error rate for each of the plurality of channels comprises:
   calculating a set of signal-to-noise ratios (SNRs) for the each of the plurality of channels based at least in part on power data for the each of the plurality of channels;

determining a counter of the set of SNRs based on an SNR threshold; and predicting the error rate based at least in part on the counter.

6. The method of claim 5, wherein the counter indicates a number of the SNRs that exceed the SNR threshold.

7. The method of claim 1, wherein selecting the hopset of channels comprises selecting a predetermined number of channels from the plurality of channels by comparing the predicted error rates for the plurality of channels with one or more predetermined thresholds.

8. An unmanned aerial vehicle (UAV), comprising:

a memory that stores one or more computer-executable instructions; and one or more processors configured to access the memory and execute the computer-executable instructions to perform a method comprising:

obtaining power data associated with a plurality of channels of a frequency band comprising:

selecting a measurement set including one or more measurement channels from the plurality of channels, a collective set bandwidth of the measurement set covering the frequency band;

obtaining power data for the measurement set by obtaining power data for each of the one or more measurement channels in the measurement set; and obtaining the power data for the plurality of channels using the power data for the measurement set;

predicting an error rate for each of the plurality of channels based at least in part on the power data for the plurality of channels; and selecting a hopset of channels for frequency hopping from the plurality of channels based at least in part on the predicted error rates for the plurality of channels.

9. The UAV of claim 8, wherein predicting the error rate for each of the plurality of channels comprises:

calculating a set of signal-to-noise ratios (SNRs) for the each of the plurality of channels based at least in part on power data for the each of the plurality of channels;

determining a counter of the set of SNRs based on an SNR threshold; and predicting the error rate based at least in part on the counter.

10. The UAV of claim 8, wherein selecting the hopset of channels comprises selecting a predetermined number of channels from the plurality of channels by comparing the predicted error rates for the plurality of channels with one or more predetermined thresholds.

11. The UAV of claim 8, wherein the hopset of channels is used by the UAV to receive signals from a remote terminal via an uplink.

12. The UAV of claim 11, wherein the method further comprises transmitting information about the hopset to the remote terminal via a downlink with the remote terminal.

13. The UAV of claim 11, wherein the method further comprises selecting a channel from the hopset for receiving signals from the remote terminal based on a function of the hopset and a timestamp.

14. A communication system, comprising:

a memory that stores one or more computer-executable instructions; and one or more processors configured to access the memory and execute the computer-executable instructions to perform a method comprising:

obtaining power data associated with a plurality of channels of a frequency band comprising:

selecting a measurement set including one or more measurement channels from the plurality of channels, a collective set bandwidth of the measurement set covering the frequency band;

obtaining power data for the measurement set by obtaining power data for each of the one or more measurement channels in the measurement set; and obtaining the power data for the plurality of channels using the power data for the measurement set;

predicting an error rate for each of the plurality of channels based at least in part on the power data for the plurality of channels; and selecting a hopset of channels for frequency hopping from the plurality of channels based at least in part on the predicted error rates for the plurality of channels.

15. The communication system of claim 14, wherein the plurality of channels comprise a first channel and a second channel that overlaps with the first channel, wherein the first channel is in the measurement set and the second channel is not in the measurement set, and wherein power data for the second channel is obtained based on the power data for the first channel.

16. The communication system of claim 14, wherein predicting the error rate for each of the plurality of channels comprises:

calculating a set of signal-to-noise ratios (SNRs) for the each of the plurality of channels based at least in part on power data for the each of the plurality of channels;

determining a counter of the set of SNRs based on an SNR threshold, the counter indicating a number of the SNRs that exceed the SNR threshold; and predicting the error rate based at least in part on the counter.

17. The communication system of claim 14, wherein selecting the hopset of channels comprises selecting a predetermined number of channels from the plurality of channels by comparing the predicted error rates for the plurality of channels with one or more predetermined thresholds.

* * * * *